US011475531B2

(12) United States Patent
Ganesan et al.

(10) Patent No.: US 11,475,531 B2
(45) Date of Patent: Oct. 18, 2022

(54) METHOD AND SYSTEM FOR ADAPTIVE INVENTORY REPLENISHMENT

(71) Applicant: Tata Consultancy Services Limited, Mumbai (IN)

(72) Inventors: Viswanath Kumar Ganesan, Chennai (IN); Ananda Padmanaban Srinivas, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/913,005

(22) Filed: Jun. 26, 2020

(65) Prior Publication Data

US 2021/0035250 A1    Feb. 4, 2021

(30) Foreign Application Priority Data

Jun. 27, 2019  (IN) .............................. 201921025715

(51) Int. Cl.
*G06Q 50/28* (2012.01)
*G06N 20/00* (2019.01)
*G06Q 10/06* (2012.01)

(52) U.S. Cl.
CPC ............. *G06Q 50/28* (2013.01); *G06N 20/00* (2019.01); *G06Q 10/067* (2013.01); *G06Q 10/06315* (2013.01)

(58) Field of Classification Search
CPC ............ G06Q 50/28; G06Q 10/06315; G06Q 10/067; G06Q 10/087; G06N 20/00
See application file for complete search history.

(56) References Cited

U.S. PATENT DOCUMENTS

| | | | |
|---|---|---|---|
| 7,668,761 B2 | 2/2010 | Jenkins et al. | |
| 2003/0004784 A1 | 1/2003 | Li et al. | |
| 2010/0065632 A1* | 3/2010 | Babcock | G06Q 50/28 705/28 |
| 2012/0054076 A1* | 3/2012 | Wu | G06Q 10/087 705/28 |
| 2015/0379449 A1* | 12/2015 | Gopinath | G06Q 10/087 705/7.25 |
| 2018/0374138 A1* | 12/2018 | Mohamed | G06N 5/04 |
| 2019/0266554 A1* | 8/2019 | Lin | G06Q 10/087 |

* cited by examiner

*Primary Examiner* — Mehmet Yesildag
*Assistant Examiner* — Ayanna Minor
(74) *Attorney, Agent, or Firm* — Finnegan, Henderson, Farabow, Garrett & Dunner, LLP (57) ABSTRACT

The disclosure herein generally relates to inventory management, and, more particularly, to a method and system for adaptive inventory replenishment. The system collects real-time information on product-inflow, product-outflow, and damaged goods, as input, and processes the inputs to learn a product-replenishment pattern. Further, a replenishment policy that matches the learnt product-replenishment pattern is selected, and based on the selected replenishment policy, at least one product-replenishment recommendation for the collected real-time information is generated.

6 Claims, 4 Drawing Sheets

METHOD AND SYSTEM FOR ADAPTIVE INVENTORY REPLENISHMENT

PRIORITY CLAIM

This U.S. patent application claims priority under 35 U.S.C. § 119 to: India Application No. 201921025715, filed on Jun. 27, 2019. The entire contents of the aforementioned application are incorporated herein by reference.

TECHNICAL FIELD

This disclosure relates generally to inventory management, and more particularly to a method and system for adaptive inventory replenishment.

BACKGROUND

Many industries require movement of goods between different entities of a network (more likely from an upstream entity to a downstream entity), as part of inventory/goods management. One example is a supply chain in which wholesale dealers, retail dealers, warehouses, customers and so on form different nodes of a supply chain network. For smooth operation, it is important to make sure that there is proper flow of goods between the different nodes. For example, when one item is about to run out of stock in a retail store, the wholesale dealer is expected to supply the goods to replenish stock of the retail dealer.

The inventors here have recognized several technical problems with such conventional systems, as explained below. If the wholesale dealer doesn't have enough stock of the required goods in warehouse, then the retailer runs out of stock and this in turn may affect the business. Perishability of goods is another factor to consider. Certain items (for example, fruits and vegetables) are perishable i.e. they have short life span. As a result, it is difficult to stock up such items for a longer time, and hence, appropriate replenishment measures need to be taken.

SUMMARY

Embodiments of the present disclosure present technological improvements as solutions to one or more of the above-mentioned technical problems recognized by the inventors in conventional systems. For example, in one embodiment, a processor implemented method of inventory replenishment is provided. In this method, initially a replenishment data model for a retail scenario is generated using a reinforcement Learning (RL) approach, via one or more hardware processors, wherein generating the replenishment data model comprises modeling the retail scenario as a reinforcement learning model, wherein each state from among a plurality of states in the reinforcement learning model represents values of one or more parameters of a product-inflow, a product-outflow, and amount of damaged goods, at an instance of time. Further, real-time information on product-inflow, product-outflow, and damaged goods, are collected as input, via the one or more hardware processors. Then the real-time information are processed using the replenishment data model, via the one or more hardware processors. Based on processing of the real-time information using the replenishment data model, at least one product-replenishment recommendation to replenish one or more products is generated, via the one or more hardware processors.

In another aspect, a system for inventory replenishment is provided. The system includes one or more hardware processors, a communication interface, and a memory comprising a plurality of instructions. The plurality of instructions when executed, cause the one or more hardware processors to generate a replenishment data model for a retail scenario using a reinforcement Learning (RL) approach, via one or more hardware processors, wherein generating the replenishment data model comprises modeling the retail scenario as a reinforcement learning model, wherein each state from among a plurality of states in the reinforcement learning model represents values of one or more parameters of a product-inflow, a product-outflow, and amount of damaged goods, at an instance of time. The system then collects real-time information on product-inflow, product-outflow, and damaged goods, as input. The system processes the real-time information using the replenishment data model, and generates at least one product-replenishment recommendation to replenish one or more products.

In yet another aspect, a non-transitory computer readable medium for inventory replenishment is provided. A plurality of instructions stored in a storage space (memory) form the non-transitory computer readable medium, which, when executed, cause one or more hardware processors to perform the inventory replenishment explained below. In this process, initially a replenishment data model for a retail scenario is generated using a reinforcement Learning (RL) approach, via one or more hardware processors, wherein generating the replenishment data model comprises modeling the retail scenario as a reinforcement learning model, wherein each state from among a plurality of states in the reinforcement learning model represents values of one or more parameters of a product-inflow, a product-outflow, and amount of damaged goods, at an instance of time. Further, real-time information on product-inflow, product-outflow, and damaged goods, are collected as input, via the one or more hardware processors. Then the real-time information are processed using the replenishment data model, via the one or more hardware processors. Based on processing of the real-time information using the replenishment data model, at least one product-replenishment recommendation to replenish one or more products is generated, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
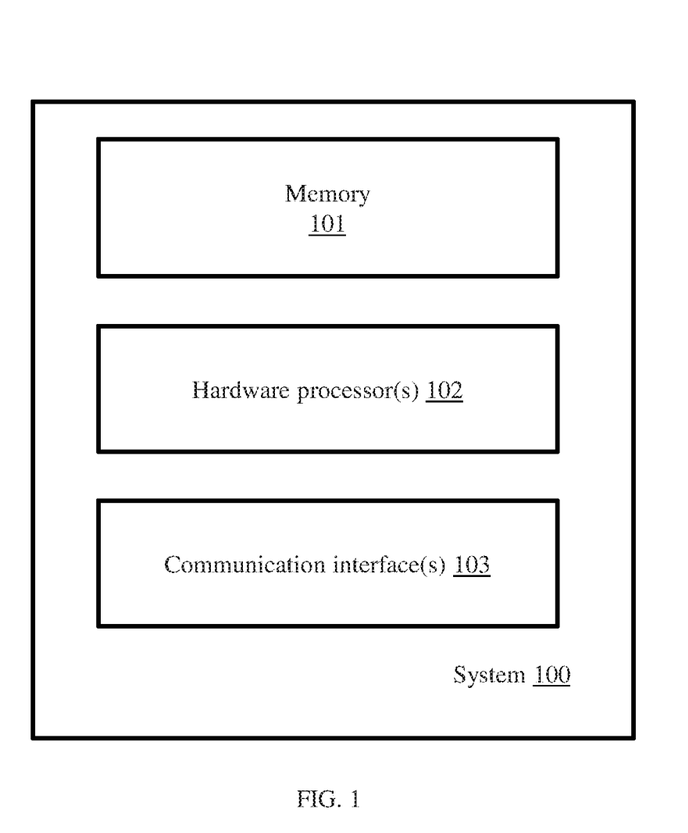
FIG. 1 illustrates an exemplary system for inventory replenishment, according to some embodiments of the present disclosure.

FIG. 1 illustrates an exemplary system for inventory replenishment, according to some embodiments of the present disclosure. The system 100 includes a memory 101, one or more hardware processors 102, and a communication interface 103.

Figure 2A:
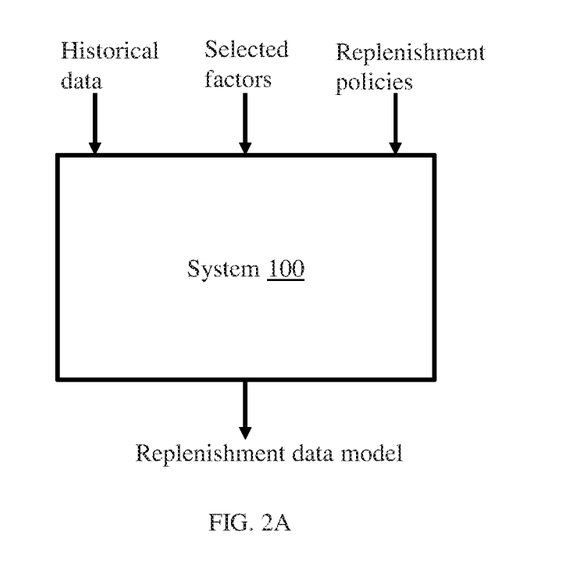
FIGS. 2A and 2B (collectively referred to as FIG. 2) illustrate generation of replenishment model and use of the replenishment model for generating predictions, using system of FIG. 1, according to some embodiments of the present disclosure.
Figure 2B:
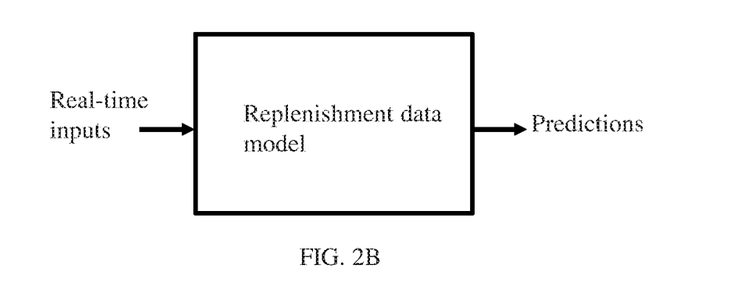

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the hardware processor(s) 102 are configured to fetch and execute computer-readable instructions stored in the memory 101, which causes the hardware processor(s) 102 to perform actions depicted in FIG. 2 for the purpose of performing the inventory replenishment. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory 101 stores a plurality of instructions which when executed, cause the one or more hardware processors 102 to perform one or more actions corresponding to the inventory replenishment being handled by the system 100.

The system 100 can be used to process data from any industry which constitute a plurality of nodes, and in which goods movement is required between nodes, so as to replenish stock of goods at each node (to ensure that each node has a sufficient quantity/amount of goods at any point of time).

Figure 3:
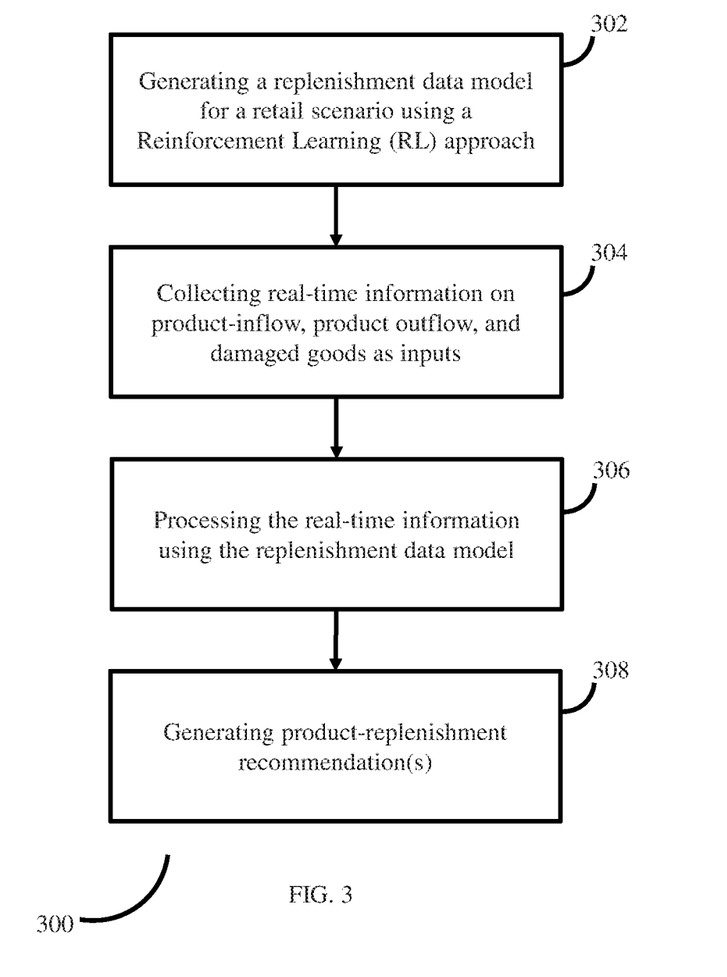
FIG. 3 is a flow diagram depicting steps involved in the process of inventory management being performed by the system of FIG. 1, in accordance with some embodiments of the present disclosure.

Broad level steps involved in the process of inventory replenishment are depicted in FIG. 3, and the working details are explained by considering a wholesale-retail-warehouse (referred to as 'retail scenario') scenario as an example. It is to be noted that the description below does not intent to limit scope to the retail scenario.

In order to generate inventory replenishment recommendations for a retail scenario being considered. The system 100 initially generates (302) a replenishment data model (alternately referred to as 'replenishment model', 'model' throughout the description) which represents the retail scenario being handled by the system 100 at a given point of time, using data such as but not limited to history data, selected factors, and a set of replenishment policies.

1. History data (also referred to as 'historical product-replenishment characteristics'): The history data refers to data pertaining to previous business trends, customer purchase history, customer behavior, and so on.
2. Selected factors: The factors may be associated with product categorization, product lifecycle, market demand with business cycles and seasonality, minimum/maximum storage space, cost and price of the goods, cost of holding goods, ordering or procurement costs, shortage costs, and so on.
3. Replenishment policies (also referred to as 'inventory policies'): The replenishment policies govern the creation and purpose of the replenishment model generation.

A few example parameters that may be considered by the system 100 as the history data and the selected factors are given below:

Historical customer demand: The historical customer demand is captured by the system 100 sales data for a specific time duration (for example, daily volume of data collected). If a new product being introduced, the system 100 generates the historical customer demand by using an appropriate technique. For example, a compound Poisson process can be used by the system 100, where size of the demand is defined to have the discrete uniform distribution.

Future demand data: The future demand data for a fixed duration of time (for example, a daily/weekly granularity based on sales) is generated by the system 100 using a suitable technique (for example, a time-series forecasting process). The system 100 can be configured to incorporate information on any impact of market campaigns/promotions being carried out, into a future demand profile that is generated as an output while generating the future demand data.

Holding costs: Holding cost refers to cost incurred for storing goods in an inventory at a warehouse from the time instant of receipt of the goods (or product) till the product is shipped to the customer.

Ordering cost (or set up costs): The cost of shipment of goods (or product) from the supplier location to the warehouse and also includes other costs associated with procurement of goods for placement of a purchase order is known as ordering cost.

Surplus and shortage costs: The cost of holding additional inventory over and above the market demand for a given period for additional time period is defined as surplus cost. The penalty involved in not fulfilling the demand to a customer due to non-availability of goods (or products) is defined as shortage cost.

Supply and Delivery Lead times: The time taken to ship a product from the supplier location to warehouse location is supply lead time. The time taken to ship a product from warehouse to customer location is delivery lead time.

Order Frequency: Number of times either a warehouse manager (or a customer) places an order with the supplier (with the warehouse) is defined as order frequency. Historical values of order frequencies are taken as inputs for the machine learning model.

Supply and Demand Variance: Statistical variance in supply quantity of a product as well as any deviations with respect to an order placed from the warehouse as procurement quantity is pre-computed using the historical data, and is referred to as the "Supply and Demand Variance". The same is too defined with respect to customer demand data.

Customer Contracts: The customer contracts define a list of products along with order fulfillment commitments defined at a service level, mentioning what percent of time shortages will be allowed at the customer side and how many times a requested order quantity will be fulfilled.

Delivery logistics data: Availability of trucks or other means for transportation/shipment of goods to customers or from suppliers is used to define the minimum and maximum order frequency values.

Customer data: The list of customers along with their historical list of products ordered from the warehouse.

Supplier data: The list of suppliers along with their historical list of products ordered from the supplier to the warehouse.

Steps involved in generating the replenishment model by the system are explained below:

In order to generate the replenishment model (alternately referred to as 'model' or 'data model'), the system 100 is configured to make a few assumptions. A few examples of such assumptions are listed below. However, it is to be noted that such appropriate assumptions, matching the input data and/or requirements can be defined and configured with the system 100.

Future demand data is generated using a time-series forecasting process and any impact of market campaigns/promotions are incorporated into future demand profile.

Historical data is used for training the model and the future demand data is taken as one of the inputs to the replenishment model.

Order is placed for procurement with an order quantity Q that is defined based on the nature of the replenishment policy in operation.

Ordering cost or set up costs are incurred every time an order is placed.

Order can be replenished fully with an expected lead time L and the standard deviation of lead time is defined as l.

Shortages in inventories are allowed and the surplus inventories are carried forward to the next planning period. Here, planning period refers to a specific time span, which may be pre-defined or may be dynamically defined and configured with the system 100.

Backorders are not considered and shortages are assumed to be lost demand.

Joint replenishment between multiple products are not considered.

The life cycle of a product could be divided into following phases: introduction (phase 1), growth (phase 2), maturity (phase 3), and decline (phases 4 and 5). The classification into different phases is based on age of the product. For example, if the product being considered is a fruit, phase 1 and phase 2 may indicate/represent stages of pre-edible condition of the fruit, phase 3 may represent fruit being in edible state, and the fruit being in phase 4 may indicate that health of the fruit is deteriorating, and that the fruit is not good for consumption. Many of the product gets replaced due to various business needs (due to refinement in composition, change in product attributes such as color, and so on) with new products. In any retail scenario, the introduction of new products is gradual with simultaneous gradual reduction in production (as well as sales) of the old products that are presently available in the market. The definitions of products (both old and new) with necessary changes in historical data are captured in Life Cycle Management activities. The definition for changes that need to be performed on historical data may be captured as rules which accommodate the necessary corrections to be performed on the historical data to provide the required business forecasts for both old and new products. For example it could be 80:20 (old:new) in the first month, 60:40 in the second month and so on till the old product gets completely eliminated from supplies. In another scenario, in which an existing product is to be eliminated without any replacement or a new product is to be introduced which may not have any replacements, the system 100 is configured to consider rules matching these scenarios, so as to provide forecasts/recommendations based on the rules defined to accommodate the business requirements of introducing new products without any replacements and eliminating existing product without any replacements.

Another input generated by the system 100 for generating the replenishment model is a set of inventory policies. The inventory policies used by the system 100 may be stock based inventory policies, which replenish inventory based on inventory levels at nodes being considered, based on market demand. A few examples of the inventory policies are given below:

i. Policy 1: periodic (R, S) policy, where every R time units (the review period) an order is placed to raise the inventory position to level S;

ii. Policy 2: periodic (R, s, S) policy, where every R time units, an order is placed to raise the inventory position to level S provided the inventory position has reached or fallen below the re-order level s;

iii. Policy 3: periodic (R, s, Q) policy, where every R time units an order of Q units is placed provided the inventory position is less than or equal to s;

iv. the continuous (s, S) policy, where an order is placed to raise the inventory position to level S when the inventory position falls to or below level s; and v. the continuous (s, Q) policy, where Q units are ordered when the inventory position falls to or below level s.

It is to be noted that, apart from the aforementioned 5 policies, any similar policy may be defined and used as per requirements and as per the industry, and in turn, the number of policies considered at a time also can vary as per requirements.

Values of the maximum inventory position S may be defined as the maximum or average of weekly demands observed over past historical demand periods and Q can be computed using any suitable mechanism/approach (for example, Economic Order Quantity (EOQ) formulae) or can be set to be equal to the expected forecast demand in the future time periods. EOQ works well when the demand is more or less flat with no trend or seasonality.

Using the aforementioned data, the system 100 models the sales scenario to generate the data model. In an embodiment, the system models the sale scenario as a Reinforcement Learning (RL) based data model (also referred to as 'reinforcement learning data model'), using a RL approach/technique. States and actions defined for the RL based model is explained below:

States and actions: Requirements in the inventory replenishment scenario are dynamic in nature. Which means the requirements and the parameters associated with it changes from time to time. As a result, replenishment suggestions generated by the system 100 for a given set of inputs at a time instance 't' may not be valid or may not be efficient at time instance 't+1' as certain parameters, or values of certain parameters may have changed between 't' and 't+1'. In order to accommodate the changing requirements and the parameters, the model is configured to handle self-learning and training over historical data and based on data collected in real-time. A set of propositions are introduced to enable the self-learning and training of the model. These propositions are characterizations obtained from the inventory policies to estimate re-order quantity, number of re-order points, under and overstocking implications, and demand behavior. The system 100 can be configured to represent the state as a tuple which contains average surplus, frequency of surplus, average shortage and frequency of shortage considering the past historical demand over predefined horizon of time.

1. Proposition 1: Increase in inventory holding cost necessitates re-computation of reorder quantity i.e., minimization of re-order quantity.
2. Proposition 2: Increase in set up costs necessitates minimization of number of re-orders which eventually turns out increasing the re-order quantity for each order.
3. Proposition 3: Overstocking in inventories results in a need to move from periodic review policy to continuous review policy.
4. Proposition 4: Continual shortages in inventories requires a shift from periodic review policy to continuous review policy.
5. Proposition 5: Change in demand behaviour from flat pattern to an increasing or decreasing trend requires switch to a continuous review policy.
6. Proposition 6: Change in demand behaviour to the flat pattern from increasing or decreasing trend requires switch from continuous to periodic review policy.
7. Proposition 7: Demand in maturity phase of the product with flat pattern can be fulfilled with periodic review policy.

It is to be noted that the number and type of propositions also can vary as per requirements and the industry. During the reinforcement learning, the system 100 uses combination of shortages (avg shortage), frequency of shortages (freq shortage) and surplus (avg surplus) inventories over past 'n' periods to trigger the need for evaluation of a policy change. Each state in the RL model represents values of one or more parameters of the product-inflow, the product-outflow, and the damaged goods, at an instance of time. An adaptation of any suitable algorithm such as Q-learning algorithm is used by the system 100 during the reinforcement learning process to select and use the mentioned replenishment policies in the model. Following notations are defined before presenting the algorithm.

Examples of components of the RL data model are given in Table. 1.

TABLE 1

| | |
|---|---|
| Action | An array that contains different inventory policies that can be applied |
| S | policy index |
| A | action index |
| $S_t$ | state tuple which represents an array containing average shortage, frequency of shortages and average surplus during a time period. |
| Policy | a dictionary that maps an action to a state. |
| Returns | reward which is the total cost incurred |
| state_action_reward | an array that keeps track of the states, actions and their corresponding rewards |
| state_action_return | an array that contains the mean episodic reward for the specified time period |
| seen_action_state | an array containing the state-action pairs that have been visited already. It is used as a caching mechanism. |
| DISCOUNT_FACTOR | a factor that is set to 0.9 to ensure that the RL algorithm places higher weightage on long-term rewards. (Values closer to 1.0 are used to 'discount' the immediate reward) |
| EPSILON | a factor used to balance exploration and exploitation by assigning a 20% chance to choose a random inventory policy. |
| Demand | an array containing the forecasted demand values. |
| G | reward for an episode |
| Q | Q-table which contains the reward for each action taken in each state. |
| V | contains the maximum return corresponding to the best action for a given state in the Q-table |

The following symbols have been used:
{ } to refer to dictionaries or key-value pairs.
( ) to refer to sets where only unique elements are permitted.
[ ] to refer to arrays.

An algorithmic representation of the process adopted b the system 100 for generating the model using the RL is given below:

1. Initialize variables
    policy = { },
    Q = { },
    returns = { },
    actions = set of all inventory policies under consideration,
    state_action_reward = [ ],
    DISCOUNT_FACTOR = 0.9,
    EPSILON = 0.2
2. for time period t in Demand:
    a. St = [avg shortaget, freq shortaget, avg surplust]
    b. If random(0, 1) < (1 − EPSILON)
    i. action = policy[S]
    c. else: action = random(actions)
    d. reward = −1 × costt
    e. if end of Demand has been reached:
    i. state_action_reward.append([St, null, reward])
    ii. break
    f. else:
    i. state_action_reward.append([St, action, reward])
    g. G = 0, state_action_return = [ ]
    h. for state, action, reward in reversed(state_action_reward)[1:]:

```
    i. state_action_return.append([state, action, G])
    ii. G = reward + DISCOUNT_FACTOR x G
3. seen_state_action = ( )
4. Loop until Q[s] converges:
    a. for state, action, G in state_action_return:
        i. if [state, action] not in seen_state_action:
            1. returns[[state, action]].append(G)
            2. Q[s][a] = mean(retusrns[[state, action]])
            3. seen_state_action.append([state, action])
    b. for s in policy.keys( ):
        i. policy[s] = argmax(Q[s])
5. V = { }
6. for s in policy.keys( ):
    a. V[s] = max(Q[s])
    b. return V, policy
```

The values of average shortages, frequency of shortages and average surplus are pre-estimated based on a training data set with a planning horizon of n periods considering the cost vs benefit trade-off for the aforementioned policies. The values of each of these parameters and other data fetched/generated at different steps of the method for inventory replenishment are stored in the memory 101. The system 100 uses the forecast data together with the historical data, on a rolling window basis, to decide need for trigger for the policy change. Any significant change in the cost data (i.e., ordering costs and holding costs) necessitate the recompilation of the state-action transition matrix using the historical as well as forecast data to redefine the selection of policies.

The system 100 uses this approach to generate the data model specific to the retail scenario for which the predictions are to be generated by the system 100. The data model thus generated may be stored in the memory 101.

Once the model is generated for the retail scenario being considered, the system 100 collects (304) real-time information on one or more parameters associated with product-inflow, product outflow, and damaged goods. The system 100 may use varieties of sensors and appropriate combination of sensors to get the real-time information. In an embodiment, the system 100 also collects manual inputs with respect to one or more of the parameters. For example, an authorized user may use an appropriate user interface provided by the communication interface(s) 103 to enter values of amount of goods damaged over a period of time being considered.

The system 100 then processes (306) the collected real-time information using the replenishment data model, and generates (308) the product-replenishment recommendation. This data may indicate to the user one or more actions that may be taken/executed so as to ensure inventory stock replenishment. The product-replenishment recommendation includes calculated values for re-order quantity, order frequency, and safety stocks at one or more service levels.

The safety stocks are defined in supply chain echelons when uncertainty exists in demand, supply or in transportation lead time. The safety stocks provide how much additional quantity of inventory of a product needs to be kept reducing the risk of the product in terms of stock-out scenarios. The safety stocks is a buffer stock when sales exceed the planned market demand, and/or the supplier is not able to deliver the necessary units of product on time.

Figure 4:
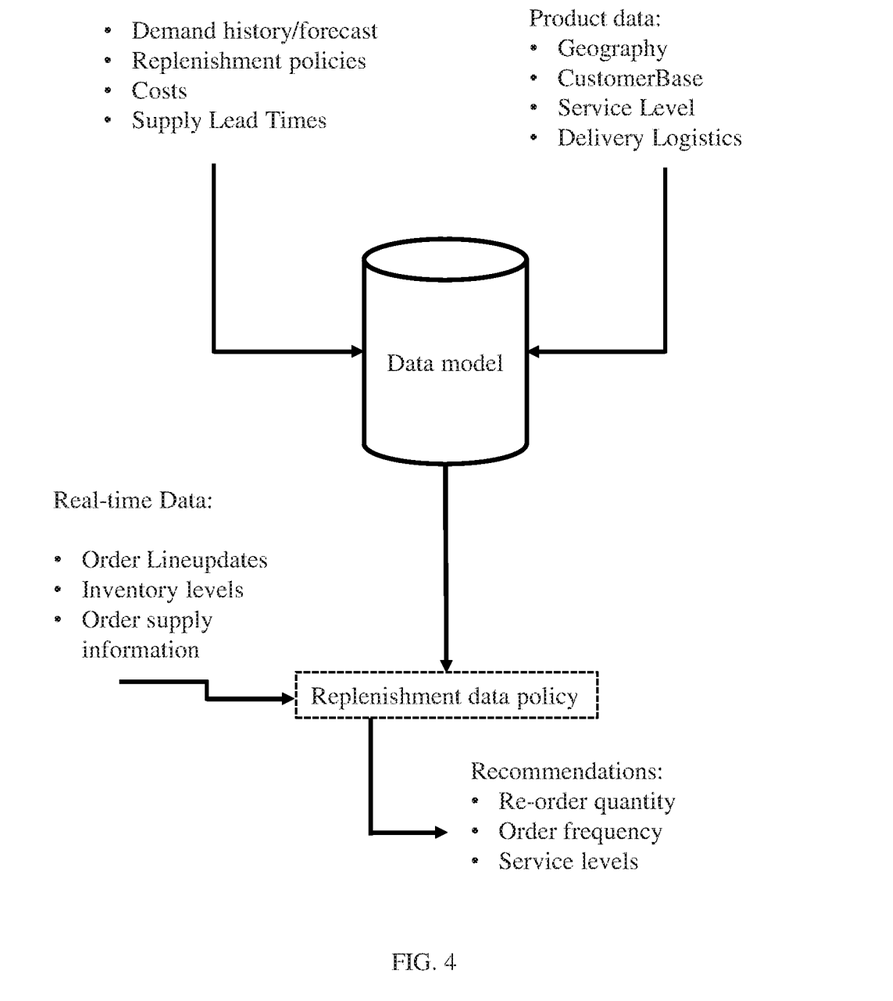
FIG. 4 is an example diagram depicting working of the system of FIG. 1 in a real-time scenario, in accordance with some embodiments of the present disclosure.

The safety stock can be calculated using the below formulae:

$$\text{Safety Stock} = z_\alpha \sqrt{E(D) s_D^2 + E(D)^2 s_L^2} \quad (1)$$

where $\alpha$ is the service level $E(L)$ and $s_L$ are the mean and the standard deviation of lead time $E(D)$ and $s_D$ are the mean and the standard deviation of demand An example of working of the system 100 in a real-time scenario is depicted in FIG. 4. Once the system 100 is deployed for real-time operation, the system 100 generates the data model using various product-specific information, historical information, and any other required information. Once the data model is generated, the system 100 collects and processes real-time information (for example: order line updates, inventory details, order supply information and so on, certain combination of which represent data in-flow, data-outflow, and so on. Information on damaged goods also is collected as one of the inputs), and processes the real-time information (inputs), using the data model. The system 100 uses appropriate replenishment policy in the data model to generate appropriate recommendations. The data model may contain pre-estimated information on values of average shortages, frequency of shortages, and average surplus, generated/calculated based on a training data set with a planning horizon of n periods considering the cost vs benefit trade-off for the mentioned five policies. The forecast data together with the historical data is eventually used on the rolling window basis to decide the need for trigger for the policy change.

The system 100 ensures that the demand is satisfied at the service levels and the shortages are avoided as much as possible with simultaneous minimization of total costs. However, in practice, new operating scenarios and demand or market dynamics may occur, and the system 100 is required to foresee that there could be unexpected stockout situations which have been compensated using safety stock definitions. The computations for definitions of safety stock can be defined using the combination of frequency of shortages, average shortages, average surplus, and the corresponding policy definitions together with desired service levels of demand fulfillment defined using parameter $\alpha$. Higher service levels necessitate storing higher quantities of the product as safety stock and hence more lock up working capital for an organization.

The system 100 uses the reinforcement learning approach together with the safety stock definitions with the four dimensions with the expected service levels to ensure that right amount of safety stocks are estimated for various policy definitions that will enable the system 100 to hold no safety stocks during the periods of surplus inventory and enable storing minimal levels of safety stock considering anticipated out of stock scenarios from the historical data.

TABLE 2

Definition of safety stock values for various operational and policy combinations

| Tuple | Policy | Service Levels, $\alpha$ | Safety Stock Definition |
| --- | --- | --- | --- |
| (Ave Shortages, Freq of Shortages, Ave Surplus) | (R, S) Policy | 99% | Xxx |
| (Ave Shortages, Freq of Shortages, Ave Surplus) | (R, S) Policy | 95% | yyy |

The forecast data together with the corresponding demand profile, and the planning horizon information is used to evaluate policy definitions considering the average shortages, frequency of shortages and average surplus values. Table. 3 shows example of data derived from the reinforcement learning process. The data in table.3 is leveraged to provide the policy recommendation with right choice of replenishment plans. Any change in the demand profile (i.e., shift of profile from increasing trend to flat trend or decreasing trend) results in recompilation of the average shortages, frequency of shortages, and average surplus values, which may necessitate the trigger for policy change.

TABLE 3

| Planning Horizon N | Demand Profile Increasing Trend | Average Shortages $D_1$ | Frequency of Shortages $f_1$ | Average Surplus $S_1$ | Policy Recommendation (s, S) Policy | Replenishment Plans (q, ρ, α) |
|---|---|---|---|---|---|---|
| — | — | — | — | — | — | — |

If the demand profile creates a new combination of values for the average shortages, frequency of shortages, and average surplus values, all the predefined policies are evaluated and the reinforcement learning process is leveraged to create new data point in the Table.3 for desired levels of service and feasible order frequency. The changes in cost definitions, shift in demand profiles due to market conditions, and competition may bring in the need to capture new demand profiles with corresponding policy and plan recommendations in the replenishment data model. Finally, in response to the real-time information collected, the system 100 generates one or more product-replenishment recommendations. A few examples of such product-replenishment recommendations are depicted in FIG. 4 i.e. re-order quantity, order frequency, and service levels, for each of the products.

In an embodiment, one or more steps in method 300 may be omitted. In another embodiment, the steps in method 300 may be performed in the same order as depicted in FIG. 3 or in any alternate order technically feasible.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method of inventory replenishment, comprising:

training, based on a reinforcement Learning (RL) approach, a replenishment data model using a first set of data, via one or more hardware processors, wherein the training of the replenishment data model comprises modeling a retail scenario as a reinforcement learning model, wherein each state from a plurality of states in the reinforcement learning model represents values of one or more parameters of a product-inflow, a product-outflow, and an amount of damaged goods, at an instance of time; and the first set of data comprises historical data associated with the retail scenario, a plurality of selected factors associated with the retail scenario, and a plurality of replenishment policies associated with the retail scenario;

collecting real-time information on the product-inflow, the product-outflow, and the amount of damaged goods, as an input, via the one or more hardware processors;

processing the real-time information using the replenishment data model, via the one or more hardware processors, wherein the replenishment data model is configured to handle self-learning and training over the historical data and based on the data collected in real-time; and generating, at least one product-replenishment recommendation to replenish one or more products, based on the real-time information and the replenishment data model, and with safety stock definitions, wherein a safety stock is defined using a combination of frequency of shortages, average shortages, average surplus, and corresponding policy definitions with predefined service levels, wherein the replenishment data model uses an appropriate replenishment policy to generate the recommendations, wherein the at least one product-replenishment recommendation comprises calculated values for re-order quantity, order frequency, and the safety stocks at the one or more service levels generated based on the first set of data;

retraining, based on the RL approach, the replenishment data model using a second set of data, wherein the second set of data comprises the first set of data and the real-time information via the one or more hardware processors; and estimating amount of the safety stocks for various policy definitions using the reinforcement data model and the safety stock definitions with the frequency of shortages, the average shortages, the average surplus, and the corresponding policy definitions with pre-defined service levels, via the one or more hardware processors.

2. The processor implemented method as claimed in claim 1, further comprising generating the replenishment data model using values of a plurality of historical product replenishment characteristics, product movement characteristics, and Product Life Cycle (PLC) characteristics.

3. A system for inventory replenishment, comprising:
one or more hardware processors;
a communication interface; and
a memory comprising a plurality of instructions, wherein the plurality of instructions when executed, cause the one or more hardware processors to:
train, based on a reinforcement Learning (RL) approach, a replenishment data model using a first set of data via one or more hardware processors, wherein the training of the replenishment data model comprises modeling a retail scenario as a reinforcement learning model,
wherein each state from a plurality of states in the reinforcement learning model represents values of one or more parameters of a product-inflow, a product-outflow, and an amount of damaged goods, at an instance of time; and
the first set of data comprises historical data associated with the retail scenario, a plurality of selected factors associated with the retail scenario, and a plurality of replenishment policies associated with the retail scenario;
collect real-time information on the product-inflow, the product-outflow, and the amount of damaged goods, as an input;
process the real-time information using the replenishment data model, wherein the replenishment data model is configured to handle self-learning and training over the historical data and based on the data collected in real-time; and
generate at least one product-replenishment recommendation to replenish one or more products, based on the real-time information and the replenishment data model, and with safety stock definitions, wherein a safety stock is defined using a combination of frequency of shortages, average shortages, average surplus, and corresponding policy definitions with pre-defined service levels, wherein the replenishment data model uses an appropriate replenishment policy to generate the recommendations, wherein the at least one product-replenishment recommendation comprises calculated values for re-order quantity, order frequency, and the safety stocks at the one or more service levels generated based on the first set of data;
retrain, based on the RL approach, the replenishment data model using a second set of data, wherein the second set of data comprises the first set of data and the real-time information; and
estimate amount of the safety stocks for various policy definitions using the reinforcement data model and the safety stock definitions with the frequency of shortages, the average shortages, the average surplus, and the corresponding policy definitions with pre-defined service levels.

4. The system as claimed in claim 3, wherein the system is configured to generate the replenishment data model using values of a plurality of historical product replenishment characteristics, product movement characteristics, and Product Life Cycle (PLC) characteristics.

5. A non-transitory computer readable medium for inventory replenishment, the non-transitory computer readable medium performs the inventory replenishment by:
training, based on a reinforcement Learning (RL) approach, a replenishment data model using a first set of data using a reinforcement Learning (RL) approach, via one or more hardware processors, wherein the training of the replenishment data model comprises modeling a retail scenario as a reinforcement learning model, wherein each state from a plurality of states in the reinforcement learning model represents values of one or more parameters of a product-inflow, a product-outflow, and an amount of damaged goods, at an instance of time; and
the first set of data comprises historical data associated with the retail scenario, a plurality of selected factors associated with the retail scenario, and a plurality of replenishment policies associated with the retail scenario;
collecting real-time information on the product-inflow, the product-outflow, and the amount of damaged goods, as an input, via the one or more hardware processors;
processing the real-time information using the replenishment data model, via the one or more hardware processors, wherein the replenishment data model is configured to handle self-learning and training over the historical data and based on the data collected in real-time; and
generating at least one product-replenishment recommendation to replenish one or more products, based on the real-time information and the replenishment data model, and with safety stock definitions, wherein a safety stock is defined using a combination of frequency of shortages, average shortages, average surplus, and corresponding policy definitions with pre-defined service levels, wherein the replenishment data model uses an appropriate replenishment policy to generate the recommendations, wherein the at least one product-replenishment recommendation comprises calculated values for re-order quantity, order frequency, and the safety stocks at the one or more service levels generated based on the first set of data, via the one or more hardware processors;
retraining, based on the RL approach, the replenishment data model using a second set of data, wherein the second set of data comprises the first set of data and the real-time information; and
estimating amount of the safety stocks for various policy definitions using the reinforcement data model and the safety stock definitions with the frequency of shortages, the average shortages, the average surplus, and the corresponding policy definitions with pre-defined service levels via the one or more hardware processors.

6. The non-transitory computer readable medium as claimed in claim 5, wherein the non-transitory computer readable medium generates the replenishment data model using values of a plurality of historical product replenishment characteristics, product movement characteristics, and Product Life Cycle (PLC) characteristics.

* * * * *